United States Patent
Yasunaga et al.

(10) Patent No.: US 8,554,427 B2
(45) Date of Patent: Oct. 8, 2013

(54) CONTROL APPARATUS FOR CONTINUOUSLY VARIABLE TRANSMISSION

(75) Inventors: Shinya Yasunaga, Tokyo (JP); Keisuke Ajimoto, Tokyo (JP); Masayuki Nishida, Tokyo (JP); Hiroki Tanaka, Tokyo (JP); Takahito Morishita, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/307,287

(22) Filed: Nov. 30, 2011

(65) Prior Publication Data

US 2012/0158258 A1    Jun. 21, 2012

(30) Foreign Application Priority Data

Dec. 16, 2010  (JP) ................. 2010-280667

(51) Int. Cl.
 *F16H 61/66*   (2006.01)
(52) U.S. Cl.
 USPC .............. 701/52; 701/51; 701/55; 701/87; 701/95
(58) Field of Classification Search
 USPC ................ 701/52, 51, 55, 87, 95
 See application file for complete search history.

(56) References Cited

U.S. PATENT DOCUMENTS 6,821,228 B2 * 11/2004 Aoki et al. .............. 477/44
7,548,810 B2 *  6/2009 Aoki ....................... 701/51

FOREIGN PATENT DOCUMENTS

JP    2001-330125 A   11/2001

* cited by examiner

*Primary Examiner* — Mary Cheung
*Assistant Examiner* — Brian P Sweeney
(74) *Attorney, Agent, or Firm* — McGinn IP Law Group, PLLC (57) ABSTRACT

In a control apparatus for a continuously variable transmission, when the difference between a target transmission gear ratio calculated immediately after switching the control mode from a manual shift mode to an automatic shift mode and a current transmission gear ratio (that is, a fixed transmission gear ratio of the transmission gear stage selected in the manual shift mode immediately before the switching) is greater than or equal to a set value, a shift control unit sets a temporary target transmission gear ratio between the target transmission gear ratio and the current transmission gear ratio. If a temporary target transmission gear ratio is set, the shift control unit causes the transmission gear ratio obtained during transition of mode from the manual shift mode to the automatic shift mode to match the target transmission gear ratio stepwise via the temporary target transmission gear ratio.

13 Claims, 9 Drawing Sheets

CONTROL APPARATUS FOR CONTINUOUSLY VARIABLE TRANSMISSION

CROSS REFERENCE TO RELATED APPLICATIONS

The present application claims priority from Japanese Patent Application No. 2010-280667 filed on Dec. 16, 2010, the entire contents of which are hereby incorporated by reference.

BACKGROUND OF THE INVENTION

1. Field of the Invention

The present invention relates to a control apparatus for a continuously variable transmission that is capable of selecting an automatic shift mode in which a transmission gear ratio is automatically changed according to the driving condition of a vehicle or a manual shift mode in which the transmission gear ratio is set according to a shift operation performed by a driver.

2. Description of the Related Art

Continuously variable transmissions (CVTs) such as belt CVTs and toroidal CVTs are capable of steplessly setting an optimum transmission gear ratio according to driving conditions such as throttle opening, vehicle speed, and engine rotational speed. However, if a driver wishes to obtain a large drive torque when driving up a hill or during acceleration or if the driver wishes to use a large amount of engine braking when driving down a hill, due to a shift pattern being set in advance for each driving area, it is difficult to set other transmission gear ratios, thus causing comfort problems with insufficient drive torque or insufficient deceleration for the driver.

To address such problems, continuously variable transmissions having a manual shift mode in which a driver can set a transmission gear ratio as desired have been proposed in recent years. In such continuously variable transmissions having the manual shift mode, a plurality of pseudo-transmission gear stages for controlling the transmission gear ratio to a certain fixed transmission gear ratio are generally set. When the shift mode is changed from the automatic shift mode to the manual shift mode, the transmission gear stage is sequentially shifted to the low-speed side each time the driver turns on a downshift switch, and the transmission gear is sequentially shifted to the high-speed side each time the driver turns on an upshift switch.

The continuously variable transmissions described above generally take measures against, for example, torque shock by setting a certain limit (guard value) on the amount of change in the transmission gear ratio upon shifting and by preventing sudden discharge or absorption of inertia torque caused by rapid changes in the transmission gear ratio (see, for example, Japanese Unexamined Patent Application Publication No. 2001-330125).

In the continuously variable transmissions having the manual shift mode, because of the control of the continuously variable transmissions, a target transmission gear ratio may be changed significantly at certain timing such as immediately after the driver has switched the shift mode from the manual shift mode to the automatic shift mode. Specifically, this situation occurs, for example, when the driver releases a acceleration pedal and switches the shift mode to the automatic shift mode from the manual shift mode where the vehicle is traveling at a high speed with a low-speed transmission gear stage. If the guard value is active in the shift operation that involves a large change in the target transmission gear ratio, the time for shifting is increased and a change occurs with unnatural behavior in which the engine speed slows down. In the continuously variable transmissions, furthermore, shifting is performed continuously, and therefore it is difficult to give a feeling like a stepped transmission to the driver, whereby the driver may feel uncomfortable.

If the guard value for the amount of change in the transmission gear ratio is eased, on the other hand, the time for shifting can be reduced, whereas, large inertia torque is generated at once when the shifting operation is completed. Therefore, it is difficult to sufficiently reduce torque shock.

SUMMARY OF THE INVENTION

The present invention has been made in view of the above circumstances, and aims to provide a control apparatus for a continuously variable transmission that can reduce time for shifting when switching a shift mode from a manual shift mode to an automatic shift mode, prevent large torque shock from occurring at once by stepped shifting with a small amount so that a driver only experiences a small amount of shock caused by shifting as appropriate, and achieve comfortable shifting in the continuously variable transmission similar to that in a stepped variable transmission.

An aspect of the present invention provides a control apparatus for a continuously variable transmission that is capable of selectively performing an automatic shift mode or a manual shift mode as a mode for shift control. The apparatus includes an automatic shift control unit, a manual shift control unit, and temporary target transmission gear ratio setting unit. The automatic shift control unit calculates a target transmission gear ratio according to a driving condition of a vehicle when the automatic shift mode is currently being selected, and causes a transmission gear ratio of the continuously variable transmission to match the target transmission gear ratio. The manual shift control unit selects one of multiple transmission gear stages, each having a fixed transmission gear ratio, according to an operation input by a driver when the manual shift mode is currently being selected, and causes the transmission gear ratio of the continuously variable transmission to match the fixed transmission gear ratio of the selected transmission gear stage. The temporary target transmission gear ratio setting unit sets a temporary target transmission gear ratio so that when a difference between a target transmission gear ratio calculated immediately after the mode is switched to the automatic shift mode and the fixed transmission gear ratio of the transmission gear that has been selected in the manual shift mode immediately before the mode is switched to the automatic shift mode is greater than or equal to a set value. The temporary target transmission gear ratio falls between the target transmission gear ratio and the fixed transmission gear ratio. If the temporary target transmission gear ratio is set, the automatic shift control unit causes the transmission gear ratio of the continuously variable transmission to match the target transmission gear ratio stepwise via the temporary target transmission gear ratio during transition of the mode from the manual shift mode to the automatic shift mode.

A control apparatus for a continuously variable transmission according to the present invention can allow comfortable shifting with desired response without causing large torque shock even if the shift mode is switched from a manual shift mode to an automatic shift mode.

DESCRIPTION OF THE PREFERRED EMBODIMENTS

Figure 1:
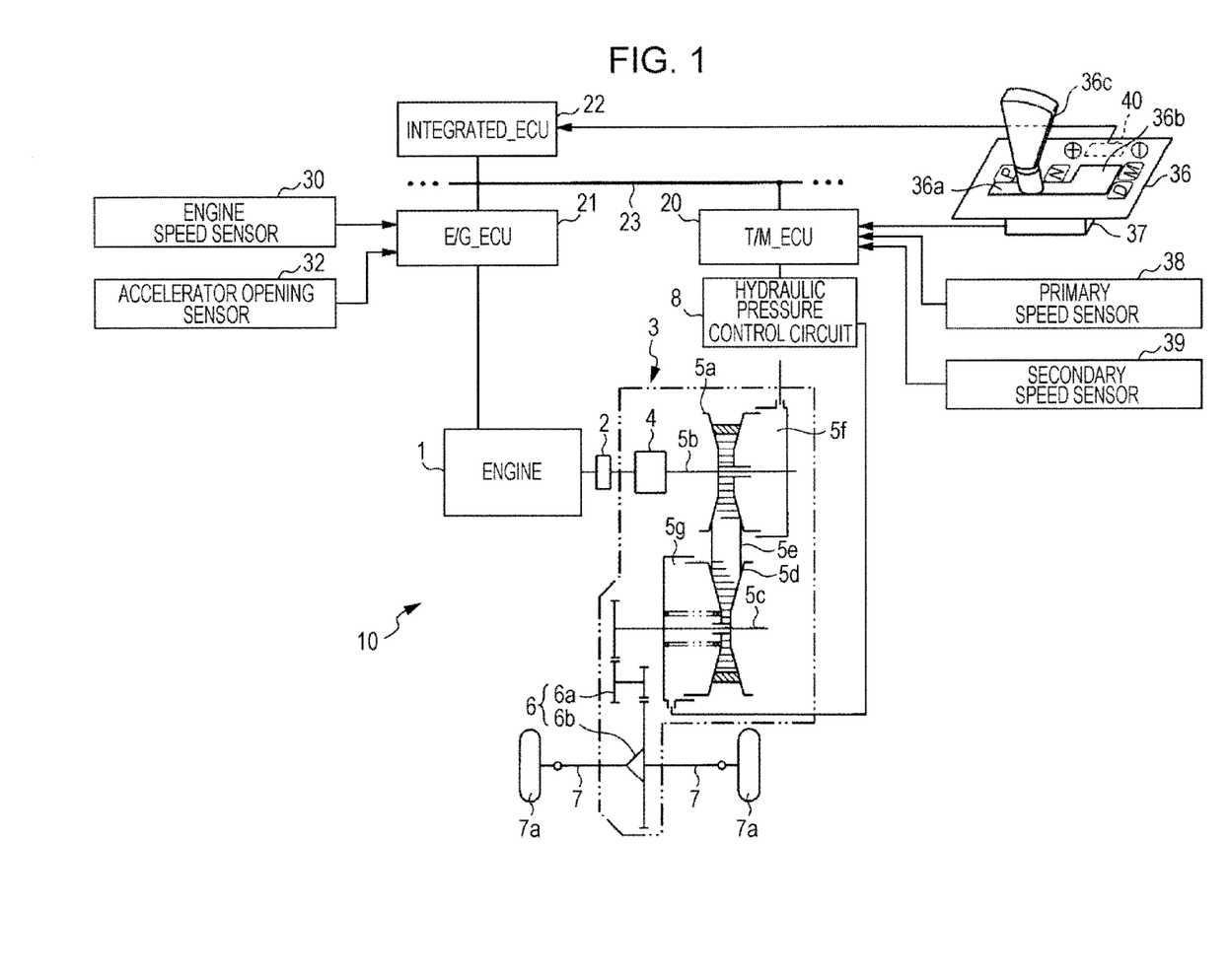
FIG. 1 is a schematic block diagram of a power train mounted in a vehicle.
Figure 2:
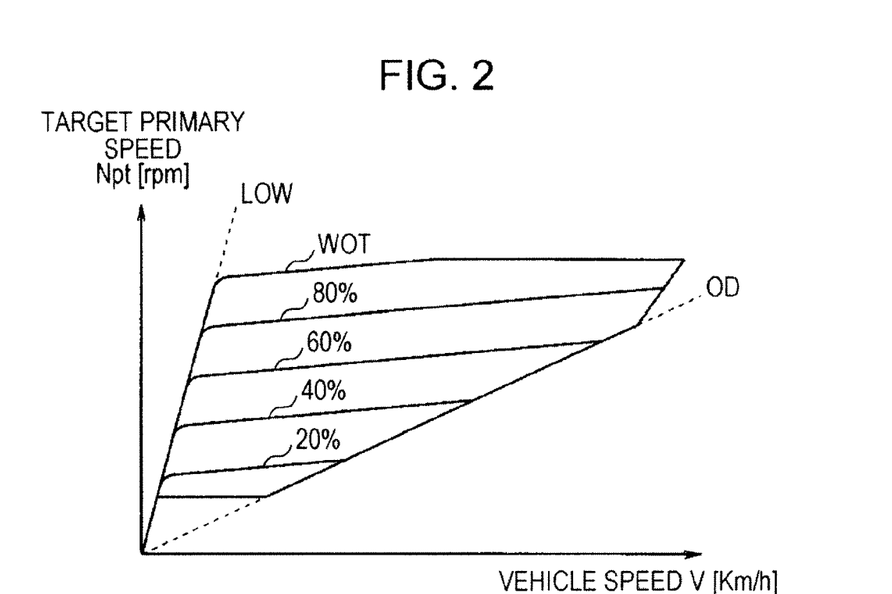
FIG. 2 is a conceptual diagram illustrating an automatic shift map.
Figure 3:
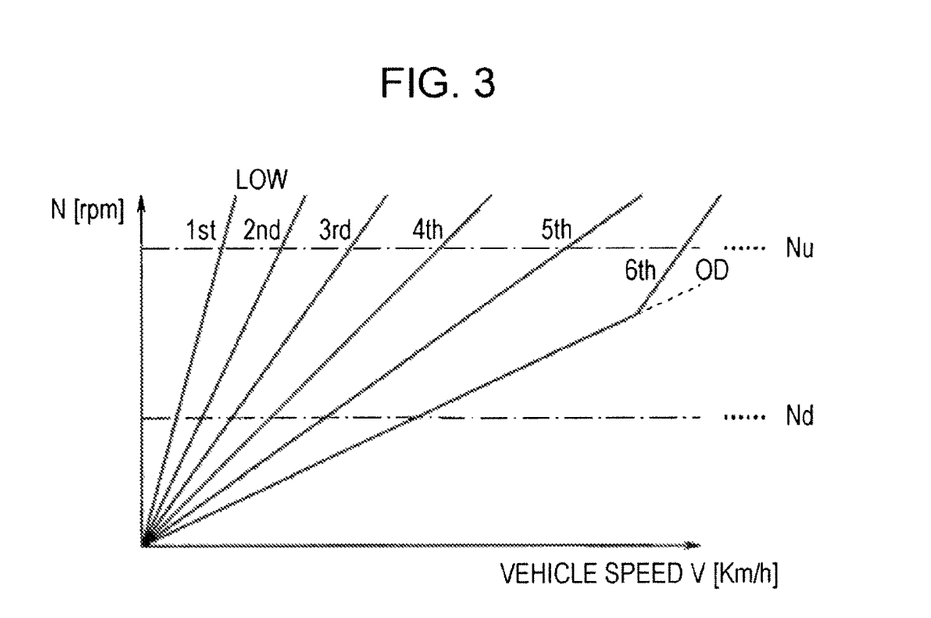
FIG. 3 is a conceptual diagram illustrating a manual shift map.
Figure 4:
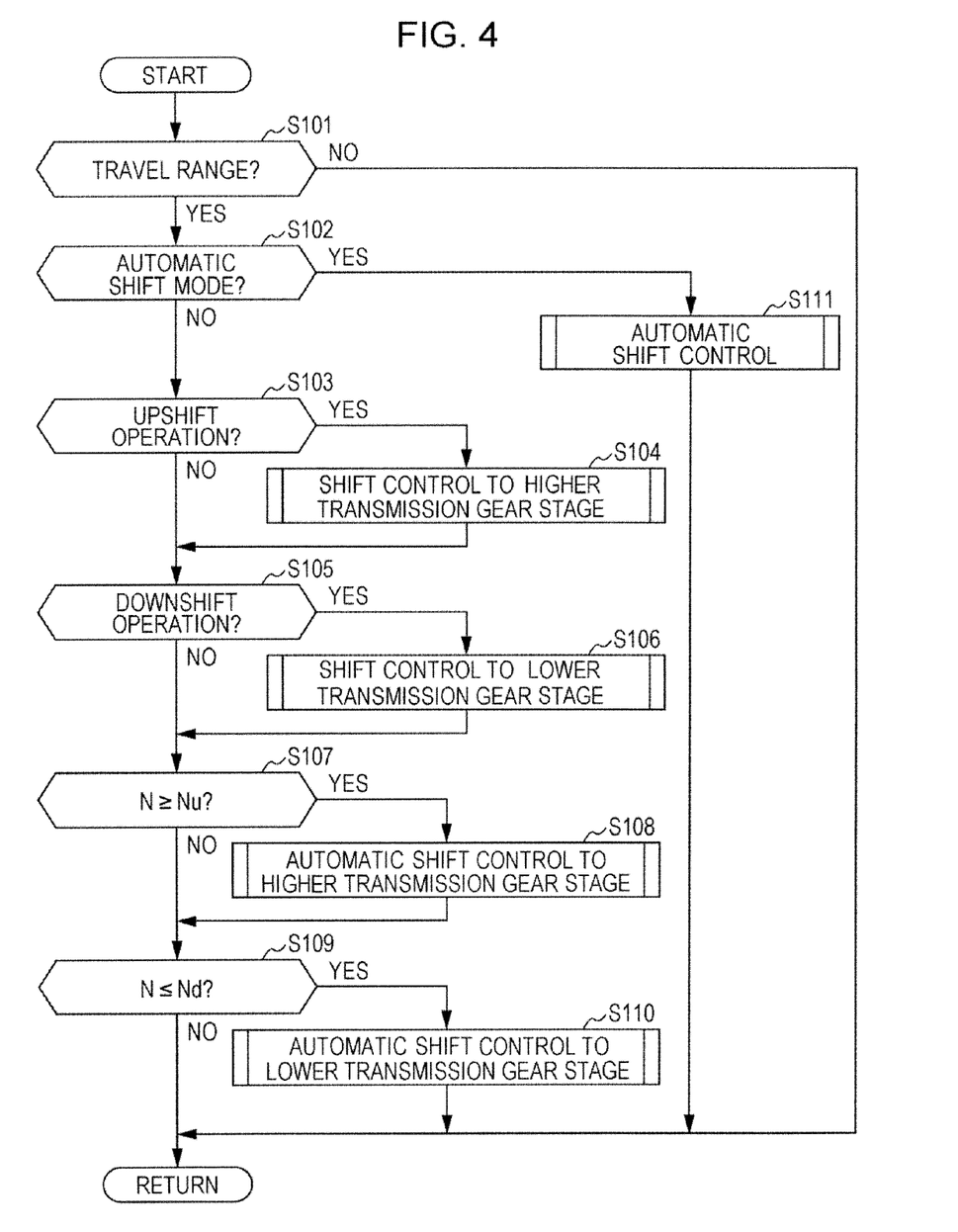
FIG. 4 is a flowchart illustrating a shift control routine for a continuously variable transmission.
Figure 5:
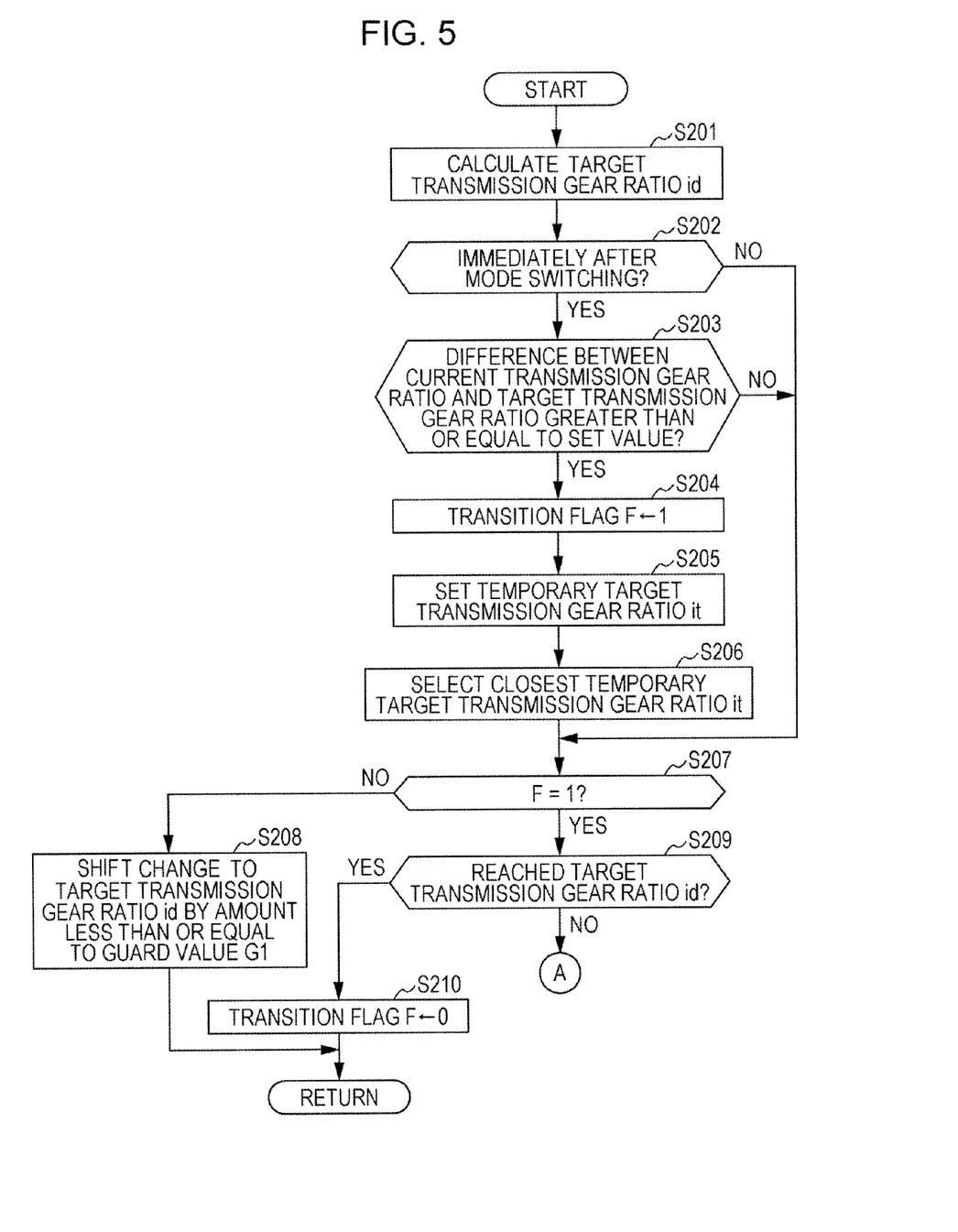
FIG. 5 is a flowchart illustrating a shift control subroutine in an automatic shift mode.
Figure 6:
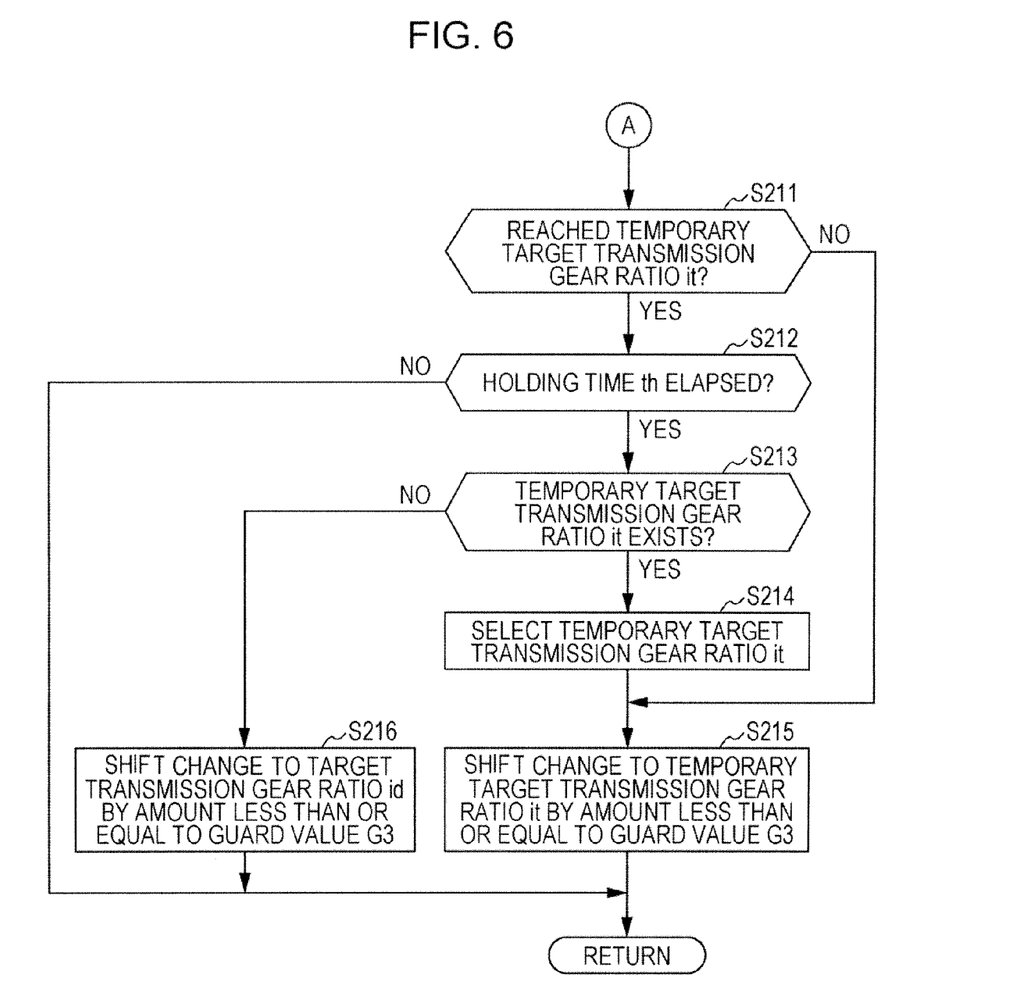
FIG. 6 is a flowchart illustrating the shift control subroutine in the automatic shift mode.
Figure 7A:
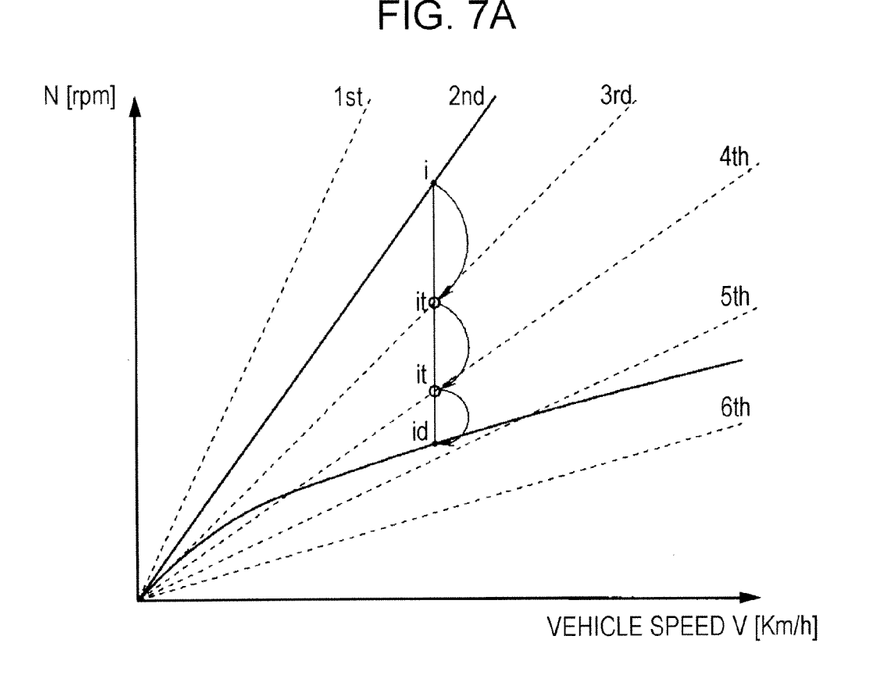
FIG. 7A is an explanatory diagram illustrating an example of a temporary target transmission gear ratio set in an upshift operation immediately after switching from the manual shift mode to the automatic shift mode.
Figure 7B:
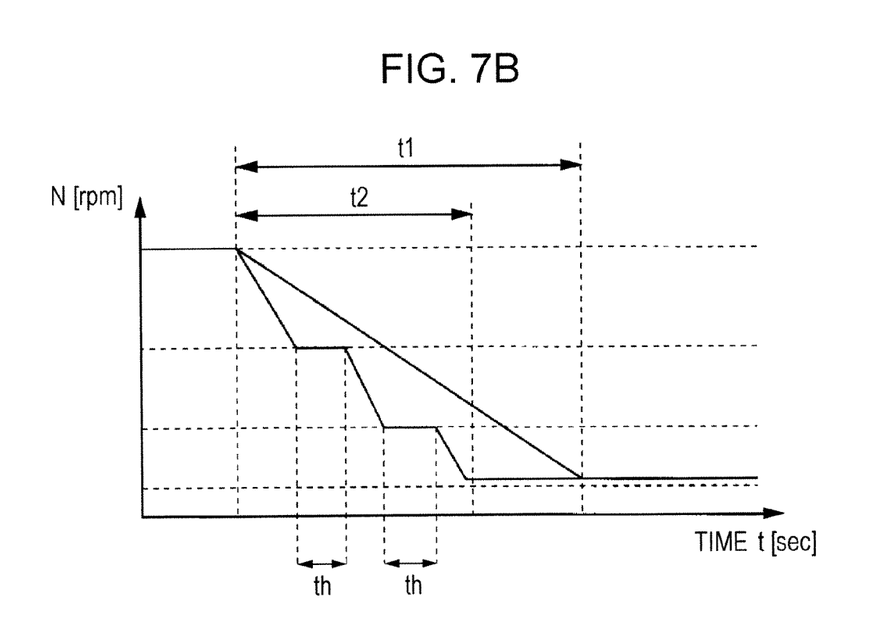
FIG. 7B is an explanatory diagram illustrating changes in the engine speed in the upshift operation.
Figure 8A:
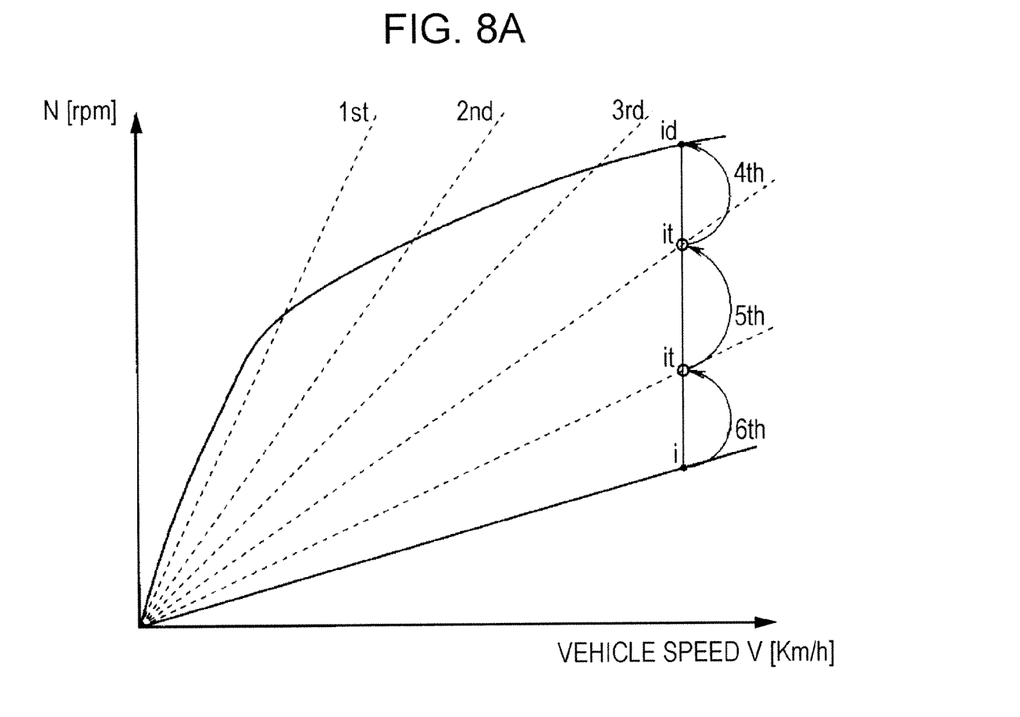
FIG. 8A is an explanatory diagram illustrating an example of a temporary target transmission gear ratio set in a downshift operation immediately after switching from the manual shift mode to the automatic shift mode.
Figure 8B:
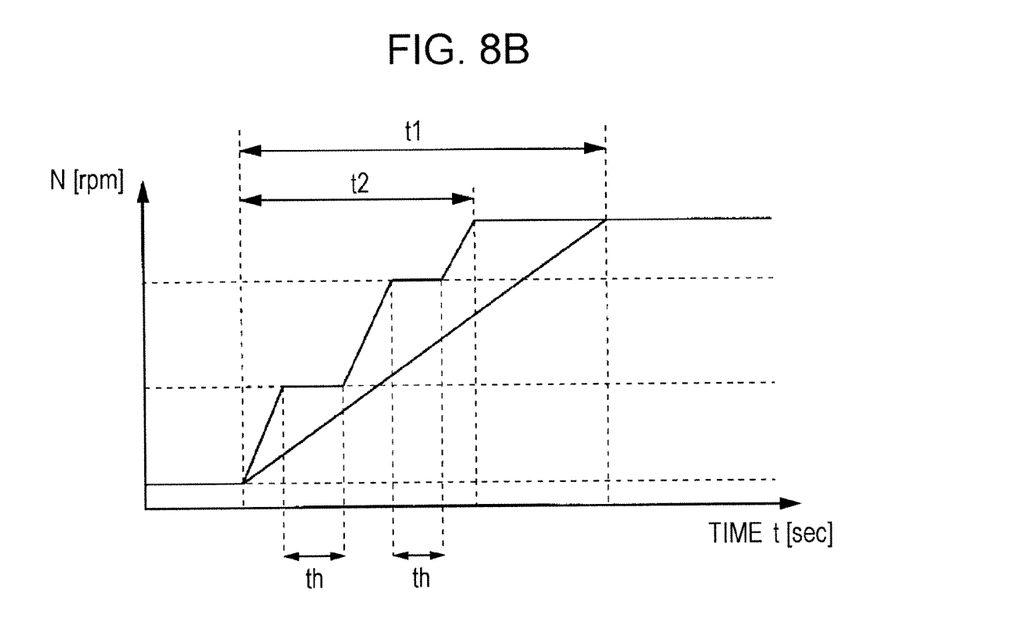
FIG. 8B is an explanatory diagram illustrating changes in the engine speed in the downshift operation.
Figure 9A:
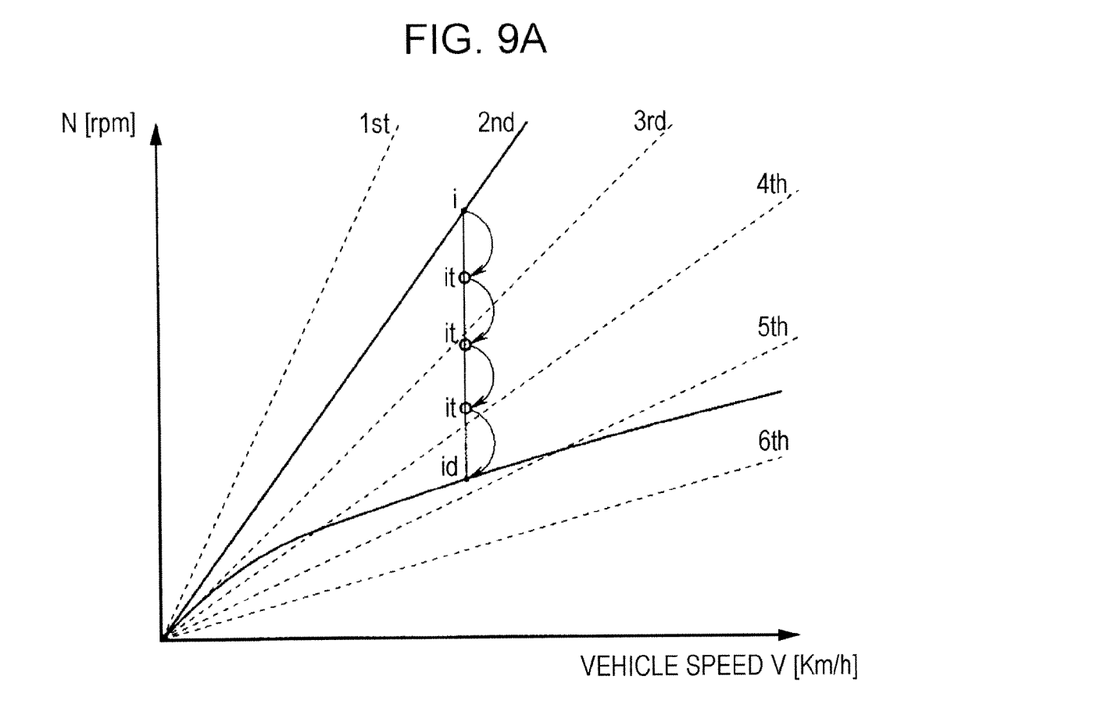
FIG. 9A is an explanatory diagram illustrating a modification of the temporary target transmission gear ratio set in the upshift operation immediately after switching from the manual shift mode to the automatic shift mode.
Figure 9B:
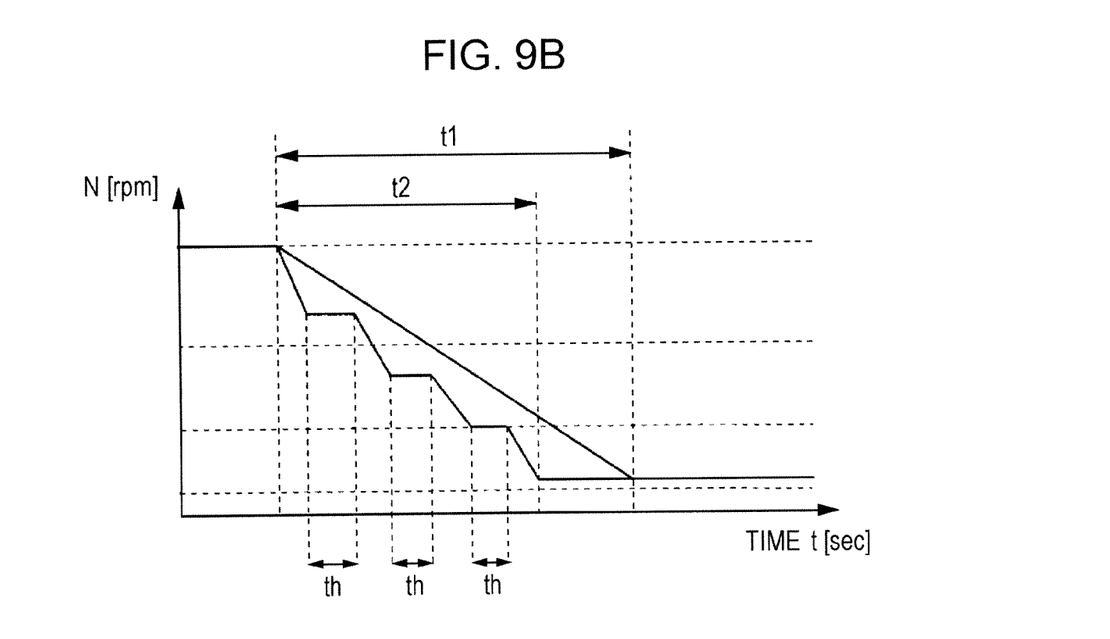
FIG. 9B is an explanatory diagram illustrating changes in the engine speed in the upshift operation.
Figure 10A:
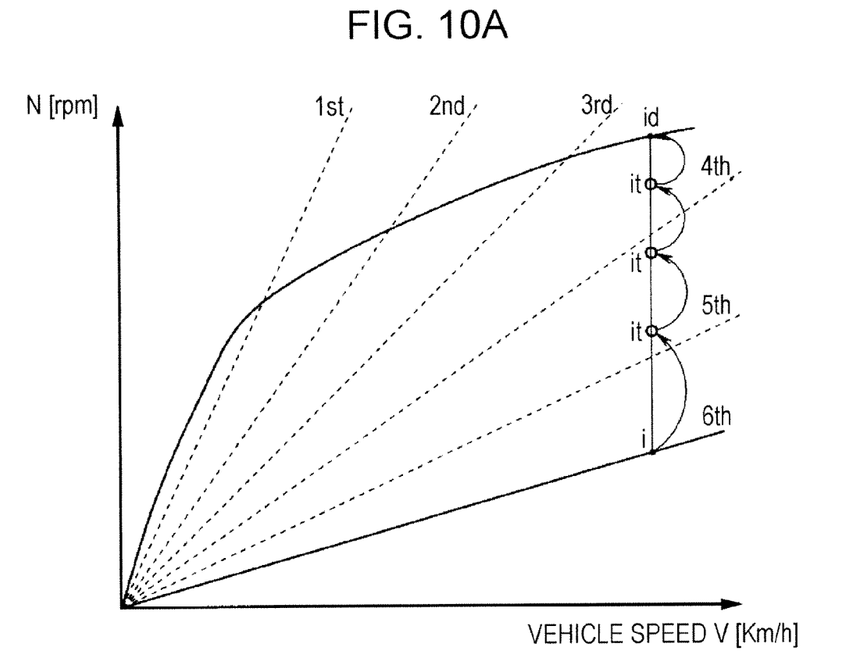
FIG. 10A is an explanatory diagram illustrating a modification of the temporary target transmission gear ratio set in the downshift operation immediately after switching from the manual shift mode to the automatic shift mode.
Figure 10B:
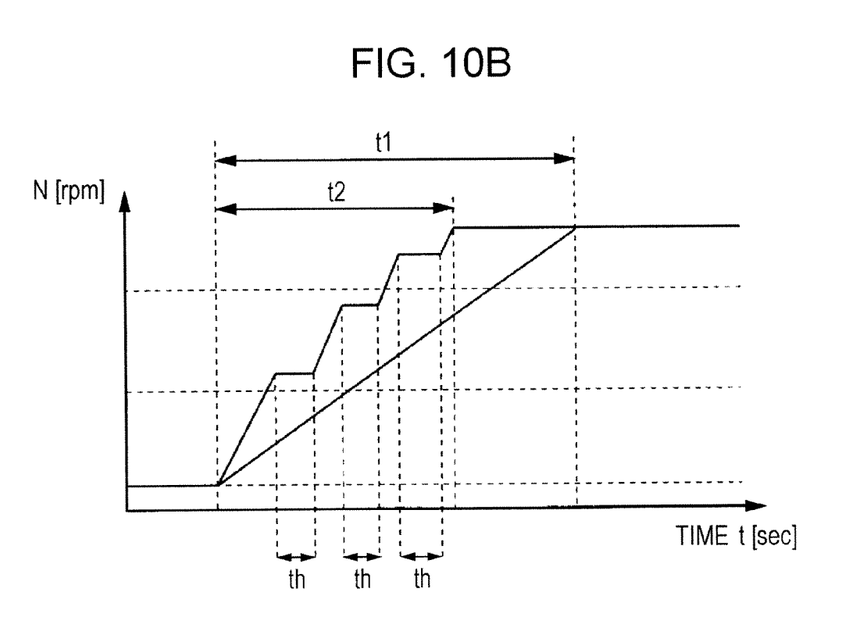
FIG. 10B is an explanatory diagram illustrating changes in the engine speed in the downshift operation.

An embodiment of the present invention will be described with reference to the drawings that illustrate an embodiment of the present invention: FIG. 1 is a schematic block diagram of a power train mounted in a vehicle; FIG. 2 is a conceptual diagram illustrating an automatic shift map; FIG. 3 is a conceptual diagram illustrating a manual shift map; FIG. 4 is a flowchart illustrating a shift control routine for a continuously variable transmission; FIGS. 5 and 6 are flowcharts illustrating a shift control subroutine in an automatic shift mode; FIG. 7A is an explanatory diagram illustrating an example of a temporary target transmission gear ratio set in the upshift operation immediately after switching from the manual shift mode to the automatic shift mode; FIG. 7B is an explanatory diagram illustrating changes in the engine speed in the upshift operation; FIG. 8A is an explanatory diagram illustrating an example of a temporary target transmission gear ratio set in the downshift operation immediately after switching from the manual shift mode to the automatic shift mode; FIG. 8B is an explanatory diagram illustrating changes in the engine speed in the downshift operation; FIG. 9A is an explanatory diagram illustrating a modification of the temporary target transmission gear ratio set in the upshift operation immediately after switching from the manual shift mode to the automatic shift mode; FIG. 9B is an explanatory diagram illustrating changes in the engine speed in the upshift operation; FIG. 10A is an explanatory diagram illustrating a modification of the temporary target transmission gear ratio set in the downshift operation immediately after switching from the manual shift mode to the automatic shift mode; and FIG. 10B is an explanatory diagram illustrating changes in the engine speed in the downshift operation.

Referring to FIG. 1, an engine 1 forms a main part of a power train 10 of a vehicle such as an automobile by being connected to a continuously variable transmission 3 via a start-up clutch 2 such as an electromagnetic clutch and a torque converter.

The continuously variable transmission 3 includes a forward-reverse changeover device 4 connected to the start-up clutch 2. A primary pulley 5a is pivotally supported by a pulley input shaft 5b extended from the forward-reverse changeover device 4. Further, a secondary pulley 5d is pivotally supported by a pulley output shaft 5c that is arranged in parallel with the pulley input shaft 5b. A drive belt 5e is mounted in such a manner as to be wrapped around the primary pulley 5a and the secondary pulley 5d. Furthermore, the pulley output shaft 5c is connected to a differential device 6b via a reduction gear group 6a of a final reduction device 6. The differential device 6b is connected to a drive shaft 7 to which a front or rear wheel drive shaft 7a is pivotally attached. In this embodiment, the transmission gear ratio is set to "1" when the forward-reverse changeover device 4 is switched to a forward move, and an engine speed Ne and a primary rotational speed Np uniquely correspond to each other upon forward travel in which the start-up clutch 2 is fastened.

A primary hydraulic pressure chamber 5f is provided adjacent to the primary pulley 5a. A groove width of the primary pulley 5a is adjusted by means if primary hydraulic pressure supplied to the primary hydraulic pressure chamber 5f by a hydraulic pressure control circuit 8. Meanwhile, a secondary hydraulic pressure chamber 5g is provided adjacent to the secondary pulley 5d. A tensile force required for torque transmission is provided to the drive belt 5e through a secondary hydraulic pressure supplied to the secondary hydraulic pressure chamber 5g by the hydraulic pressure control circuit 8.

The hydraulic pressure control circuit 8 is controlled by a shift control unit (T/M_ECU) 20 to be described below. The groove widths of the pulleys 5a and 5d are controlled through hydraulic pressure control so as to be inversely proportional to each other, thereby allowing the continuously variable transmission 3 to attain a desired transmission gear ratio i.

To an input side of the T/M_ECU 20 connected are, for example, a primary speed sensor 38 for detecting a speed (primary speed Np) of the primary pulley 5a, a secondary speed sensor 39 for detecting a speed (secondary speed Ns) of the secondary pulley 5d, an inhibitor switch 37 for detecting a range selected on a selector 36. Further, actuators such as the hydraulic pressure control circuit 8 are connected to an output side of the T/M_ECU 20.

The selector 36 of the present embodiment includes, for example, a main gate 36a in which a parking (P) range, a reverse (R) range, a neutral (N) range, and a drive (D) range are set, and a sub-gate 36b in which a manual (M) range is set. Each of the ranges in the gates 36a and 36b is selectable through a select lever 36c, and a selected range is detected by the inhibitor switch 37. In the sub-gate 36b, an upshift (+) position and a downshift (−) position are further set with the manual range therebetween. A manual switch 40 to be described later is disposed adjacent to the upshift position and the downshift position. When the select lever 36c is operated to the upshift position or the downshift position while the manual range is being selected, the manual switch 40 outputs an upshift signal or a downshift signal. The manual switch 40 may include, for example, a paddle switch provided in a steering wheel.

The T/M_ECU 20 is connected to various control units such as an engine control unit (E/G_ECU) 21 and an integrated control unit (integrated_ECU) 22 via an in-vehicle communication line 23 such as a line using CAN (Controller Area Network) communication so as to allow communication therewith. The T/M_ECU 20 receives, for example, the engine speed Ne detected by an engine speed sensor 30, an accelerator opening θacc detected by an accelerator opening sensor 32, via the E/G_ECU 21, and also receives the upshift or downshift signal or the like detected by the manual switch 40 via the integrated_ECU 22.

T/M_ECU 20 has, for example, an automatic shift map (see FIG. 2) and a manual shift map (see FIG. 3) preset and stored in a memory thereof. The automatic shift map is used to automatically control the transmission gear ratio i of the continuously variable transmission 3, and the manual shift map is used to control the transmission gear ratio i of the continuously variable transmission 3 to a fixed transmission gear ratio im set for each of preset transmission gear stages (for example, first to sixth stages). According to any one of the selected shift maps and detection signals or the like from the sensors, the T/M_ECU 20 controls the transmission gear ratio i of the continuously variable transmission 3 through the control of hydraulic pressures supplied to the hydraulic pressure chambers 5f and 5g by the hydraulic pressure control circuit 8.

Among the above maps, the automatic shift map is used when the drive range is selected using the selector 36 and when the shift control mode for the continuously variable transmission 3 is the automatic shift mode. Specifically, in the automatic shift mode, for example, the T/M_ECU 20 refers to the automatic shift map, and calculates a target primary speed Npt (that is, a target transmission gear ratio id) based on the current vehicle speed V (for example, the vehicle speed based on the secondary speed Ns) and based on the accelerator opening θacc. Then, the T/M_ECU 20 changes the transmission gear ratio i of the continuously variable transmission 3 by an amount of change less than or equal to a preset guard value G1 so that the transmission gear ratio i matches the target transmission gear ratio id.

Here, for example, as illustrated in FIG. 2, the automatic shift map includes a map in which a shift characteristic line indicating a relationship between the vehicle speed V and the target primary speed Npt is set for each accelerator opening θacc so as to fall between a maximum transmission gear ratio "Low" and a minimum transmission gear ratio "overdrive (OD)". Further, the guard value G1 is used to suppress torque shock upon shifting, and is set to an appropriate value on the basis of, for example, an experiment or a simulation.

If the range selected using the selector 36 is changed from the drive range to the manual range and if the shift control mode for the continuously variable transmission 3 is switched from the automatic shift mode to the manual shift mode, the T/M_ECU 20 selects the manual shift map as a map for shift control.

In the manual shift mode, the T/M_ECU 20 basically selects a higher transmission gear stage than the current transmission gear stage each time an upshift signal is input to the T/M_ECU 20 from the manual switch 40 via the integrated_ECU 22. Then, the T/M_ECU 20 changes the transmission gear ratio i of the continuously variable transmission 3 by an amount of change less than or equal to a preset guard value G2 so that the transmission gear ratio i matches the fixed transmission gear ratio im of the currently selected transmission gear stage. Alternatively, the T/M_ECU 20 selects a lower-speed transmission gear stage than the current transmission gear stage each time a downshift signal is input to the T/M_ECU 20 via the integrated_ECU 22. Then, the T/M_ECU 20 changes the transmission gear ratio i of the continuously variable transmission 3 by an amount of change less than or equal to the guard value G2 so that the transmission gear ratio i matches the fixed transmission gear ratio im of the currently selected transmission gear stage. The guard value G2 is used to suppress torque shock upon shifting, and is set to an appropriate value on the basis of, for example, an experiment and a simulation.

For some purposes such as preventing overspeed of the engine 1, when the primary speed Np, which is an input speed to the continuously variable transmission 3, exceeds a preset automatic upshift speed Nu, the T/M_ECU 20 automatically changes the transmission gear ratio i to the fixed transmission gear ratio im of a higher transmission gear stage. Further, for some purposes such as securing required acceleration performance and thereby enhancing drivability, when the primary speed Np falls below a preset automatic downshift speed Nd, the T/M_ECU 20 automatically changes the transmission gear ratio i to the fixed transmission gear ratio im of a lower transmission gear stage.

When the shift mode is switched from the manual shift mode to the automatic shift mode, furthermore, the T/M_ECU 20 calculates the difference between the target transmission gear ratio id calculated immediately after the switching and the current transmission gear ratio i (that is, the fixed transmission gear ratio im of the transmission gear stage selected immediately before the switching). If the difference is greater than or equal to a set value, the T/M_ECU 20 sets one or more than one temporary target transmission gear ratio it between the current transmission gear ratio i and the target transmission gear ratio id so that the transmission gear ratio i matches the target transmission gear ratio id stepwise via the temporary target transmission gear ratio or ratios it. In this case, in order to promptly match the transmission gear ratio i of the continuously variable transmission 3 to the target transmission gear ratio id, a guard value for limiting the amount of change in the transmission gear ratio i is set to a guard value G3 that is set to be relatively higher than the guard value G1 (with a relaxed limit on the amount of change in the transmission gear ratio).

In this embodiment, therefore, the T/M_ECU 20 functions as an automatic shift control unit, a manual shift control unit, and a temporary target transmission gear ratio setting unit.

Next, shift control for the continuously variable transmission 3 executed by the T/M_ECU 20 will be descried with reference to a flowchart of a shift control routine illustrated in FIG. 4. This routine is executed every preset time interval. When the routine starts, first, in step S101, the T/M_ECU 20 determines whether or not the range currently being selected using the selector 36 is a travel range (that is, the drive range or the manual range).

If it is determined in step S101 that the current range is a range other than the travel range, the T/M_ECU 20 exits the routine without any change.

If it is determined in step S101 that the current range is the travel range, the T/M_ECU 20 proceeds to step S102. In step S102, the T/M_ECU 20 determines whether or not the current range is the drive range, that is, whether or not the automatic shift mode is currently being selected as the control mode for the continuously variable transmission 3.

If it is determined in step S102 that the current range is the manual range and thus that the manual shift mode is currently being selected as the control mode, the T/M_ECU 20 proceeds to step S103. In step S103, the T/M_ECU 20 determines whether or not an upshift operation has been performed by the driver, based on a signal from the manual switch 40.

If it is determined in step S103 that an upshift operation has been performed, the T/M_ECU 20 proceeds to step S104. If it is determined that an upshift operation has not been performed, the T/M_ECU 20 proceeds to step S105.

When the T/M_ECU 20 proceeds to step S104 from step S103, the T/M_ECU 20 determines whether or not the manual shift map includes a transmission gear stage that is higher than the current transmission gear stage. If a higher transmission gear is included, the T/M_ECU 20 shifts up the transmission gear stage of the continuously variable transmission 3 to a transmission gear stage higher by one stage than the current transmission gear stage, and then proceeds to step S105. That is, the T/M_ECU 20 changes the transmission gear ratio i of the continuously variable transmission 3 by an amount of change less than or equal to the guard value G2 through the control of hydraulic pressures to be supplied to the oil pressure chambers 5f and 5g by the hydraulic pressure control circuit 8 so that the transmission gear ratio i matches the fixed transmission gear ratio im of the newly selected transmission gear stage.

When the T/M_ECU 20 proceeds to step S105 from step S103 or step S104, the T/M_ECU 20 determines whether or not a downshift operation has been performed by the driver, based on a signal from the manual switch 40.

If it is determined in step S105 that a downshift operation has been performed, the T/M_ECU 20 proceeds to step S106. If it is determined that a downshift operation has not been performed, the T/M_ECU 20 proceeds to step S107.

When the T/M_ECU 20 proceeds to step S106 from step S105, the T/M_ECU 20 determines whether or not the manual shift map includes a transmission gear stage that is lower than the current transmission gear stage. If a lower transmission gear stage is included, the T/M_ECU 20 shifts down the transmission gear stage of the continuously variable transmission 3 to a transmission gear stage lower by one stage than the current transmission gear stage, and then proceeds to step S107. That is, the T/M_ECU 20 changes the transmission gear ratio i of the continuously variable transmission 3 by an amount of change less than or equal to the guard value G2 through the control of hydraulic pressures to be supplied to the oil pressure chambers 5f and 5g by the hydraulic pressure control circuit 8 so that the transmission gear ratio i matches the fixed transmission gear ratio im of the newly selected transmission gear stage.

When the T/M_ECU 20 proceeds to step S107 from step S105 or step S106, the T/M_ECU 20 determines whether or not the primary speed Np is higher than or equal to the currently selected automatic upshift speed Nu. If the primary speed Np is higher than or equal to the automatic upshift speed Nu, the T/M_ECU 20 proceeds to step S108. If the primary rotational speed Np is lower than the automatic upshift speed, the T/M_ECU 20 proceeds to step S109.

When the T/M_ECU 20 proceeds to step S108 from step S107, the T/M_ECU 20 determines whether or not the manual shift map includes a transmission gear stage that is higher than the current transmission gear stage. If a higher transmission gear is included, the T/M_ECU 20 shifts up the transmission gear stage of the continuously variable transmission 3 to a transmission gear stage higher by one stage than the current transmission gear stage, and then proceeds to step S109. That is, the T/M_ECU 20 changes the transmission gear ratio i of the continuously variable transmission 3 by an amount of change less than or equal to the guard value G2 through the control of hydraulic pressures to be supplied to the oil pressure chambers 5f and 5g by the hydraulic pressure control circuit 8 so that the transmission gear ratio i matches the fixed transmission gear ratio im of the newly selected transmission gear stage.

When the T/M_ECU 20 proceeds to step S109 from step S107 or step S108, the T/M_ECU 20 determines whether or not the primary speed Np is lower than or equal to the currently selected automatic downshift speed Nd. If it is determined that the primary speed Np is lower than or equal to the currently selected automatic downshift proceeds to step S110. If it is deter speed Nd, the T/M_ECU 20 mined that the primary speed Np is higher than the automatic downshift speed Nd, the T/M_ECU 20 exits the routine.

When the T/M_ECU 20 proceeds to step S110 from step S109, the T/M_ECU 20 determines whether or not the manual shift map includes a transmission gear stage that is lower than the current transmission gear. If a lower transmission gear stage is included, the T/M_ECU 20 shifts down the transmission gear stage of the continuously variable transmission 3 to a transmission gear stage lower by one stage than the current transmission gear stage, and then exits the routine. That is, the T/M_ECU 20 changes the transmission gear ratio i of the continuously variable transmission 3 by an amount of change less than or equal to the guard value G2 through the control of hydraulic pressures to be supplied to the hydraulic pressure chambers 5f and 5g by the oil pressure control circuit 8 so that the transmission gear ratio i matches the fixed transmission gear ratio im of the newly selected transmission gear stage.

If it is determined in step S102 that the current range is the drive range and that the automatic shift mode is currently being selected as the control mode, the T/M_ECU 20 proceeds to step S111. In step S111, the T/M_ECU 20 performs automatic shift control based on the automatic shift map. Then, the T/M_ECU 20 exits the routine.

Here, the automatic shift control in step S111 is executed according to, for example, a flowchart of a shift control subroutine for the automatic shift mode illustrated in FIGS. 5 and 6. When the subroutine starts, first, in step S201, the T/M_ECU 20 refers to, for example, the automatic shift map illustrated in FIG. 2, and calculates a target primary speed Npt (that is, a target transmission gear ratio id) using the accelerator opening θacc and the vehicle speed V as parameters.

Subsequently, in step S202, the T/M_ECU 20 determines whether or not the current control is control to be performed immediately after switching the selection of the control mode from the manual shift mode to the automatic shift mode. If it is determined that the current control is not control to be performed immediately after switching the selection of the control mode, the T/M_ECU 20 proceeds to step S207.

If it is determined in step S202 that the current control is control to be performed immediately after switching the selection of the control mode, the T/M_ECU 20 proceeds to step S203. In step S203, the T/M_ECU 20 determines whether or not the difference between the current transmission gear ratio i (that is, the fixed transmission gear ratio im of the transmission gear selected in the manual shift mode immediately before the switching) and the target transmission gear ratio id calculated in step S201 is greater than or equal to a set value.

If it is determined in step S203 that the difference between the current transmission gear ratio i and the target transmission gear ratio id is less than the set value, the T/M_ECU 20 proceeds to step S207. If it is determined that the difference between the current transmission gear ratio i and the target transmission gear ratio id is greater than or equal to the set value, the T/M_ECU 20 proceeds to step S204.

When the T/M_ECU 20 proceeds to step S204 from step S203, the T/M_ECU 20 sets a transition flag F to "1". The transition flag F indicates the transition occurring immediately after switching the shift control mode from the manual shift mode to the automatic shift mode.

Subsequently, in step S205, the T/M_ECU 20 sets a temporary target transmission gear ratio it between the current transmission gear ratio i (the fixed transmission gear ratio im of the transmission gear immediately before the switching) and the target transmission gear ratio id. In this embodiment, for example, the temporary target transmission gear ratio it is set to the fixed transmission gear ratio im of a transmission gear stage for the manual shift mode, which exists between the current transmission gear ratio i and the target transmission gear ratio id. For example, as illustrated in FIG. 7A, if the current transmission gear ratio i is controlled to be the fixed transmission gear ratio for the second gear stage in the manual shift mode, and fixed transmission gear ratios for the third and fourth gear stages exist between the transmission gear ratio i and the target transmission gear ratio id, these fixed transmission gear ratios are set as temporary target transmission gear ratios it. For example, as illustrated in FIG. 8A, if the current transmission gear ratio i is controlled to be a fixed transmission gear ratio for the sixth gear stage in the manual shift mode, and fixed transmission gear ratios for the fifth and fourth gear stages exist between the transmission gear ratio i and the target transmission gear ratio id, these fixed transmission gear ratios are set as temporary target transmission gear ratios it.

Subsequently, in step S206, the T/M_ECU 20 selects a temporary target transmission gear ratio it that is the closest to the current transmission gear ratio i, and then proceeds to step S207.

When the T/M_ECU 20 proceeds to step S207 from step S202, step S203, or step S206, the T/M_ECU 20 determines whether or not the transition flag F has been set to "1".

If it is determined in step S207 that the transition flag F has been reset to "0", the T/M_ECU 20 proceeds to step S208. In step S208, the T/M_ECU 20 performs shift control to change the transmission gear ratio i by an amount of change less than or equal to the guard value G1 so that the transmission gear ratio i matches the target transmission gear ratio id through the control of hydraulic pressures to be supplied to the hydraulic pressure chambers 5f and 5g by the hydraulic pressure control circuit 8. Then, the T/M_ECU 20 exits the subroutine.

If it is determined in step S207 that the transition flag F has been set to "1", the T/M_ECU 20 proceeds to step S209. In step S209, the T/M_ECU 20 determines whether or not the current transmission gear ratio i has reached the currently selected target transmission gear ratio id.

If it is determined in step S209 that the current transmission gear ratio i has reached the target transmission gear ratio id, the T/M_ECU 20 proceeds to step S210. In step S210, the T/M_ECU 20 resets the transition flag F to "0", and then exits the subroutine.

If it is determined in step S209 that the current transmission gear ratio i has not yet reached the target transmission gear ratio id, the T/M_ECU 20 proceeds to step S211 (see FIG. 6). In step S211, the T/M_ECU 20 determines whether or not the current transmission gear ratio i has reached the temporary target transmission gear ratio it.

If it is determined in step S211 that the current transmission gear ratio i has reached the temporary target transmission gear ratio it, the T/M_ECU 20 proceeds to step S212. If it is determined that the current transmission gear ratio i has not yet reached the temporary target transmission gear ratio it, the T/M_ECU 20 proceeds to step S215.

When the T/M_ECU 20 proceeds to step S212 from step S211, the T/M_ECU 20 determines whether or not a preset holding time th (for example, th=0.5 sec) has elapsed since the transmission gear ratio i reached the temporary target transmission gear ratio it. If it is determined that the holding time th has not elapsed, the T/M_ECU 20 exits the subroutine without any change.

If it is determined in step S212 that the holding time th has elapsed, the T/M_ECU 20 proceeds to step S213. In step S213, the T/M_ECU 20 determines whether or not a next temporary target transmission gear ratio it exists between the current transmission gear ratio i and the target transmission gear ratio id.

If it is determined in step S213 that no temporary target transmission gear ratio it exists, the T/M_ECU 20 proceeds to step S216. In step S216, the T/M_ECU 20 performs shift control to change the transmission gear ratio i by an amount of change less than or equal to the guard value G3 so that the transmission gear ratio i matches the target transmission gear ratio id through the control of hydraulic pressures to be supplied to the hydraulic pressure chambers 5f and 5g by the hydraulic pressure control circuit 8. Then, the T/M_ECU 20 exits the subroutine.

If it is determined in step S213 that a next temporary target transmission gear ratio it exists between the current transmission gear ratio i and the target transmission gear ratio id, the T/M_ECU 20 proceeds to step S214. In step S214, the T/M_ECU 20 newly selects a next temporary target transmission gear ratio it that is the closest to the current transmission gear ratio i, and then proceeds to step S215.

When the T/M_ECU 20 proceeds to step S215 from step S211 or step S214, the T/M_ECU 20 performs shift control to change the transmission gear ratio i by an amount of change less than or equal to the guard value G3 so that the transmission gear ratio i matches the currently selected temporary target transmission gear ratio it, and then exits the subroutine.

According to the foregoing embodiment, if the difference between the target transmission gear ratio id calculated immediately after switching the selection of the control mode from the manual shift mode to the automatic shift mode and the current transmission gear ratio i (fixed transmission gear ratio of the transmission gear stage selected in the manual shift mode immediately before the switching) is greater than or equal to a set value, a temporary target transmission gear ratio it is set so as to fall between the transmission gear ratios id and i. If a temporary target transmission gear ratio has been set, the transmission gear ratio i obtained during transition of the mode from the manual shift mode to the automatic shift mode is caused to match the target transmission gear ratio id stepwise via the temporary target transmission gear ratio it. Thus, shifting can be performed stepwise by a small amount so that the transmission gear ratio i matches the target transmission gear ratio id. Then, the guard value G3 for limiting the amount of change in the transmission gear ratio i per unit time during the transition is relatively relaxed compared to the guard value G1, which is used under normal conditions other than during the transition, or the like. Thus, the time for shifting can be reduced, and shifting can be performed stepwise by a small amount so that the driver only experiences a small amount of shift shock c as appropriate. Therefore, it is possible to prevent large torque shock from occurring at once and to achieve comfortable shifting in a continuously variable transmission similar to that a stepped variable transmission (see, for example, FIGS. 7B and 8B).

In this case, the fixed transmission gear ratio for each transmission gear stage in the manual shift mode is used as a temporary target transmission gear ratio it. Therefore, the temporary target transmission gear ratio it can be set to an appropriate value that makes the driver feel comfortable without special matching processing or the like.

In the foregoing embodiment, a fixed transmission gear ratio corresponding to each transmission gear stage in the manual shift mode is used as a temporary target transmission gear ratio it, by way of example. However, the present invention is not limited to this embodiment. Alternatively, for example, as illustrated in FIGS. 9A, 9B, 10A, and 10B, a transmission gear ratio different from the fixed transmission gear ratio for each transmission gear stage can also be set as a temporary target transmission gear ratio it.

In this case, for example, the relationship between the amount of change in the transmission gear ratio i and the amount of torque shock to be generated under each driving condition is set in advance on the basis of an experiment and a simulation. Additionally, a temporary target transmission gear ratio it is variably set according to the driving conditions so that the values of the torque shock caused at respective steps during transition are made equal to one another. As a result, transition control more comfortable for the driver or the like can be achieved.

What is claimed is:

1. A control apparatus for a continuously variable transmission, the control apparatus being capable of selectively performing an automatic shift mode or a manual shift mode as a mode for a shift control, the apparatus comprising:
    an automatic shift control unit for calculating a target transmission gear ratio according to a driving condition of a vehicle when the automatic shift mode is currently being selected, and for causing a transmission gear ratio of the continuously variable transmission to match the target transmission gear ratio;
    a manual shift control unit for selecting one of multiple transmission gear stages, each one of the multiple transmission gear stages comprising a fixed transmission gear ratio, according to an operation input by a driver when the manual shift mode is currently being selected, and for causing the transmission gear ratio of the continuously variable transmission to match the fixed transmission gear ratio of the selected transmission gear stage; and
    a temporary target transmission gear ratio setting unit for setting a temporary target transmission gear ratio so that when a difference between a target transmission gear ratio calculated immediately after the mode is switched to the automatic shift mode, and the fixed transmission gear ratio of the transmission gear that has been selected in the manual shift mode immediately before the mode is switched to the automatic shift mode is greater than or equal to a set value, the temporary target transmission gear ratio falling between the target transmission gear ratio and the fixed transmission gear ratio,
    wherein if the temporary target transmission gear ratio is set, the automatic shift control unit causes the transmission gear ratio of the continuously variable transmission to match the target transmission gear ratio stepwise via the temporary target transmission gear ratio during a transition of the mode from the manual shift mode to the automatic shift mode.

2. The control apparatus for a continuously variable transmission according to claim 1, wherein the automatic shift control unit sets a guard value used to limit an amount of change in the transmission gear ratio during the transition of the mode to be relatively higher than a guard value used at a time other than during the transition of the mode.

3. The control apparatus for a continuously variable transmission according to claim 1, wherein the temporary target transmission gear ratio setting unit sets, as the temporary target transmission gear ratio, a fixed transmission gear ratio of the transmission gear stage, which falls between the target transmission gear ratio calculated immediately after the mode is switched to the automatic shift mode and the fixed transmission gear ratio of the transmission gear that is selected in the manual shift mode immediately before the mode is switched to the automatic shift mode.

4. The control apparatus for a continuously variable transmission according to claim 2, wherein the temporary target transmission gear ratio setting unit sets, as the temporary target transmission gear ratio, a fixed transmission gear ratio of the transmission gear stage, which falls between the target transmission gear ratio calculated immediately after the mode is switched to the automatic shift mode and the fixed transmission gear ratio of the transmission gear that is selected in the manual shift mode immediately before the mode is switched to the automatic shift mode.

5. The control apparatus for a continuously variable transmission according to claim 1, wherein the temporary target transmission gear ratio setting units sets the temporary target transmission gear ratio so that values of torque shock caused at respective steps when the transmission gear ratio of the continuously variable transmission is changed stepwise are made equal to one another.

6. The control apparatus for a continuously variable transmission according to claim 2, wherein the temporary target transmission gear ratio setting units sets the temporary target transmission gear ratio so that values of torque shock caused at respective steps when the transmission gear ratio of the continuously variable transmission is changed stepwise are made equal to one another.

7. A method of controlling a continuously variable transmission (CVT), the method comprising:
    calculating a target transmission gear ratio according to a driving condition of a vehicle if an automatic shift mode is currently selected, and matching a transmission gear ratio of the CVT to the target transmission gear ratio;
    selecting a transmission gear stage of plural transmission gear stages, a transmission stage of the plural transmission gear stages comprising a fixed transmission gear ratio, if a manual shift mode is selected, and matching the transmission gear ratio of the CVT to the fixed transmission gear ratio of the selected transmission gear stage; and
    setting a temporary target transmission gear ratio so that if a difference between a target transmission gear ratio calculated immediately after the mode is switched to the automatic shift mode, and the fixed transmission gear ratio of the transmission gear that has been selected in the manual shift mode immediately before the mode is switched to the automatic shift mode is greater than or equal to a set value, the temporary target transmission gear ratio falls between the target transmission gear ratio and the fixed transmission gear ratio,
    wherein if the temporary target transmission gear ratio is set, then the transmission gear ratio of the CVT matches the target transmission gear ratio stepwise via the temporary target transmission gear ratio during a transition of the mode from the manual shift mode to the automatic shift mode.

8. The method according to claim 7, further comprising setting a guard value to limit an amount of change in the transmission gear ratio during the transition of the mode to be relatively greater than a guard value used at a time other than during the transition of the mode.

9. The method according to claim 7, further comprising setting, as the temporary target transmission gear ratio, a fixed transmission gear ratio, which falls between the target transmission gear ratio calculated immediately after the mode is switched to the automatic shift mode and the fixed transmission gear ratio of the transmission gear that is selected in the manual shift mode immediately before the mode is switched to the automatic shift mode.

10. The method according to claim 7, further comprising setting the temporary target transmission gear ratio so that values of torque shock caused at respective steps when the transmission gear ratio of the continuously variable transmission is changed stepwise are made equal to one another.

11. A method of controlling a continuously variable transmission (CVT), the method comprising:
   determining whether a mode of the CVT is being switched from an automatic mode to a manual mode;
   determining whether a value of a difference between a current transmission gear ratio and a target transmission gear ratio is greater than a predetermined value if it is determined that the mode is being switched to the manual mode; and
   setting a temporary target transmission gear ratio, said temporary target transmission gear ratio being a value between the current transmission gear ratio and the temporary target transmission gear ratio if the value of the difference is greater than the predetermined value and then selecting a closest gear ratio to the current transmission gear ratio, and changing the target transmission gear ratio by less than a guard amount if the value of the difference is less than the predetermined value.

12. The method according to claim 11, further comprising determining if the current gear ratio has reached the target gear ratio, and if the current gear ratio has reached the target gear ratio, then determining if a predetermined holding time has elapsed since reaching the target gear ratio, and if the predetermined holding time has elapsed, then determining whether a next temporary target transmission gear ratio exists between the current transmission gear ratio and the target transmission gear ratio and then shifting to the next target transmission gear ratio by an amount less than the guard value.

13. The method according to claim 12, wherein, if there is no next temporary target transmission gear ratio, then shifting to the target transmission gear ratio by less than the guard value.

* * * * *